United States Patent [19]
Peterson

[11] Patent Number: 5,026,029
[45] Date of Patent: Jun. 25, 1991

[54] SILVER CONTROLLER

[76] Inventor: David Peterson, P.O. Box 3099, Baytown, Tex. 77522

[21] Appl. No.: 421,062

[22] Filed: Oct. 13, 1989

[51] Int. Cl.$^5$ .......................... C22B 3/02; C22B 11/00
[52] U.S. Cl. ..................................... 266/170; 75/713; 75/733
[58] Field of Search .................. 266/170; 75/744, 724, 75/713, 733

[56] References Cited

U.S. PATENT DOCUMENTS

| | | | |
|---|---|---|---|
| 2,712,931 | 7/1955 | Maddock | 75/713 |
| 2,905,323 | 9/1959 | Megesi | 75/713 |
| 3,346,369 | 10/1967 | Shigley et al. | 75/713 |
| 3,369,801 | 2/1968 | Hartman | 75/713 |
| 3,630,505 | 12/1971 | Mackay | 75/713 |
| 3,744,995 | 7/1973 | MacKay | 75/109 |
| 3,840,217 | 10/1974 | MacKay | 75/109 |
| 4,227,681 | 10/1980 | Golben | 75/713 |
| 4,240,617 | 12/1980 | MacKay | 75/109 |
| 4,662,613 | 5/1987 | Woog | 266/170 |

Primary Examiner—Michael L. Lewis
Assistant Examiner—Steven Bos
Attorney, Agent, or Firm—Harrison & Egbert

[57] ABSTRACT

A silver controller comprising a container, a core member fitted within the container, a filler material around the core member, and a fluid deflector extending around the filler material. The container has an inlet and an outlet and a base. The inlet is located at a higher level than the outlet. The core member has an aperture that is distal the base. The core member has a flange that extends outwardly above the aperture of the core member. The filler material is a metal above silver in the electromotive force series. The fluid deflector is connected to the flange and extends downwardly therefrom so as to be below the aperture in the core member. A plating shield is placed exterior of the fluid deflector. The plating shield is connected to the flange member at one end and generally abuts the bottom of the container at the other end. The plating shield is of a perforated metal suitable for allowing the passage of fluids therethrough. A conductive member is in electrical contact between the filler material and the plating shield.

16 Claims, 7 Drawing Sheets

SILVER CONTROLLER

TECHNICAL FIELD

The present invention relates to apparatus for silver recovery. More specifically, the present invention relates to gravity-flow apparatus for use in the recovery of silver from spent photographic fixer solutions.

BACKGROUND ART

A number of devices employing containers for recovering silver from spent fixing solutions in photographic paper and film processes are known in the industry. These devices generally entail passing the solution containing silver salts through a metal which is above silver in the electromotive force series. The resultant chemical replacement action causes silver to be deposited within the container as the metal is dissolved. When the metal is exhausted, the contents of the container are processed at a refinery to recover the silver therefrom.

It is important to be able to control the release of silver-containing solutions into the environment. In order to safeguard the environment, it is important to remove the silver salts from solutions prior to disposing of the remaining solution. Attempts have been made, in the prior art, to fashion silver recovery systems that remove a large quantity of the silver from the solution prior to the disposal of the solution. Unfortunately, however, there remains a relatively large silver component in the solution after the solution passes through the silver recovery systems.

U.S. Pat. No. 3,369,801 issued to Harlan G. Hartman on Feb. 20, 1968, discloses a vessel in which the solution flows downward through a core tube to the bottom of the vessel and upward through steel wool to an outlet in the top of the vessel. The chemical reaction referred to above results in the deposition of silver within the vessel as the steel wool dissolves.

Metal screen is used as tho filler material in U.S. Pat. No. 3,630,505, issued to Byron R. MacKay on Dec. 28, 1971. The screen wire is therein said to be an improvement because steel wool fibers are quite small in diameter and are easily dissolved. As a consequence, large openings providing less resistive paths are created, permitting the solution to bypass the filler material and exit the vessel with the silver remaining in solution. In this patent the solution fluid is directed through a flow path from the inside surface of the container, through the screen, and upward from the bottom of the core tubing.

U.S. Pat. No. 3,655,175, issued to Victor Zeleny et al. on April 11, 1972 discloses canister in which the solution flows from the bottom of the core tube upward through metal shavings and a bed of neutralizing material of alkaline earth metal carbonate. This patent also discloses horizontal spacers or baffles separating the layers of shavings to prevent short circuitry of the solution as it flows upward through the filler material.

U.S. Pat. No. 3,840,217, issued to Michael T. MacKay on Oct. 8, 1974, discloses a plastic container with influent and effluent liquid passages in the form of T-connectors in its lid. The lower end of the influent tube is a T-shaped baffle for dispersing the influent solution. A U-shaped tube is connected between the influent and effluent connectors to accommodate solution overflow. Furthermore, the U-shaped tube is removable from the effluent connector to permit testing of the effluent solution to determine whether silver is being efficiently removed from the solution.

U.S. Pat. No. 4,441,697, issued to Donny L. Peterson et al., on April 10, 1984, discloses a plastic container with influent and effluent liquid passages. The lid has a hole for viewing the inside of the container. This device includes an elongated core with an aperture in its side extending its full length for receiving fluid which is passed through the filler material. It also has a system of longitudinal baffles designed to increase the length of flow of the fluid through the filter. The baffles have an access common to that of the core and extend the length thereof.

These prior art patents suffer from two similar problems. First, the corrosive nature of the silver-containing solution will quickly create a passageway through the filler material to the outlet. The solution will always flow in the path of least resistance. As more and more of the filler material corrodes, the flow path will follow a hole extending through the filler material which offers little resistance nor receives much of the silver deposit.

Secondly, if the silver-containing solution reaches the filler material before the silver is plated out, the silver will plate to the highly corrosive filler material. As the filler material is depleted, the silver and the filler material will fall to the bottom of the container. As such, it becomes almost impossible for the user to determine the amount of silver that has been recovered.

It is an object of the present invention to provide a silver recovery system that effectively removes a large amount of silver from a silver-containing solution.

It is another object of the present invention to provide a silver recovery system in which the silver-containing solution must traverse a lengthy path of deposition prior to exit from the system.

It is a further object of the present invention to provide a silver recovery system that is relatively inexpensive.

It is still another object of the present invention to provide a silver recovery system that enables much of the silver content of the silver-containing solution to plate onto a removable shield.

These and other objects and advantages of the present invention will become apparent from a reading of the attached specification and appended claims.

SUMMARY OF THE INVENTION

The present invention is a silver controller that comprises a container having an inlet and an outlet, a core member that is positioned within the container, a filler material that is arranged adjacent to the core member, and a fluid deflector that surrounds the filler material. The core member has an aperture that is distal the base of the container. This aperture is suitable for passing fluid to the outlet of the container. The core member has a flange member extending outwardly therefrom. The flange member is located above the aperture within the container. The filler material is a metal which is above silver in the electromotive force series. The fluid deflector is connected to the flange member and extends downwardly therefrom. This fluid deflector extends to below the aperture in the core member.

The present invention, importantly, also comprises a plating shield that is positioned exterior of the fluid deflector. This plating shield is made of a metal which is above silver in the electromotive force series. Specifically, the plating shield is connected to the flange member at one end and abuts the bottom of the container at the other end. The plating shield surrounds the fluid deflector within the container. The plating shield is also a perforated metal that is suitable for allowing the passage of fluids therethrough.

The container of the present invention is a bucket made of a non-reactive, non-corrosive material. The bucket has an inlet that extends through a wall of the bucket. The outlet of the bucket is interconnected to the core member so that fluids may pass from the interior of the core member to the outlet. The outlet opens through the wall of the bucket. The inlet of the bucket is at a higher level than the outlet of the bucket.

The core member is an elongated cylindrical member comprised of a non-reactive material, such as polyvinyl chloride. This core member is generally in abutment with the base of the container. Specifically, the core member has a bottom flange that extends outwardly therefrom. The core member is sealed to this bottom flange. The bottom flange is then in abutment with the base of the container. The combination of this flange member, the cylindrical core member, and the bottom flange gives the appearance of a spool. It is important that each of the components of this core member be of a material that is non-reactive with a corrosive silver-containing solution. A T-fitting is attached to one end of the core member so as to be in fluid communication with the interior of the core member. The other end of the T-fitting is in fluid communication with the outlet of the container.

The filler material is wound around the core member in a fashion similar to the winding of wire around a spool. This filler material abuts the interior of the fluid deflector. The fluid deflector has o e end in sealed relation to the flange member. The other end of the fluid deflector is separated from the bottom flange so as to allow fluid to pass between the fluid deflector and the bottom flange. As such, the silver-containing solution must take a circuitous pathway downwardly to the bottom of the fluid deflector and then upwardly, through the filler material, so as to reach the aperture/exit. The fluid deflector is also comprised of a non-reactive material, such as polyvinyl chloride.

The present invention also includes a conductive member that is in electrical contact between the filler material and the plating shield. Specifically, the conductive member is a conductive screw that threadedly engages the core member, extends through the filler material, the fluid deflector, and engages the plating shield. As such, any electrical charges produced from the filler material (when two dissimilar metals come in contact with an acid solution) will pass from the filler material to the plating shield.

In an alternative embodiment, a secondary filler material may be contained in the area between the plating shield and the fluid deflector. As before, this secondary filler material may be a metal which is above silver in the electromotive force series.

DETAILED DESCRIPTION OF THE INVENTION

Figure 1:
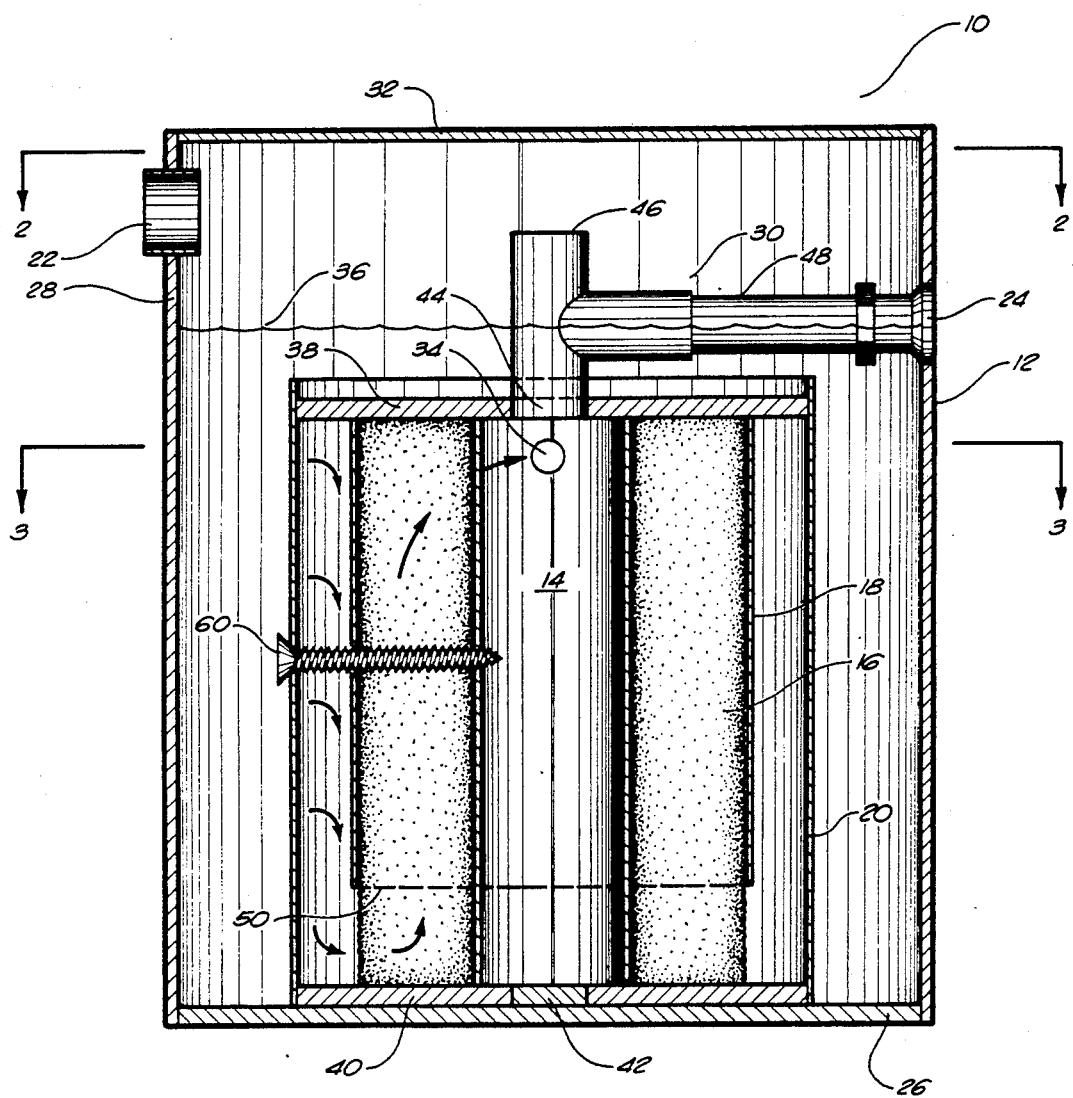
FIG. 1 is a cross-sectional view of the preferred embodiment of the silver controller of the present invention.

Referring to FIG. 1, there is shown at 10 the silver controller in accordance with the preferred embodiment of the present invention. Silver controller 10 comprises container 12, core member 14, filler material 16, and fluid deflector 18. The silver controller 10 also includes plating shield 20.

The container 10 has an inlet 22 and an outlet 24. Container 12 also includes base 26 located at the bottom of container 12. Specifically, container 12 is a bucket that has a inlet 22 extending through wall 28 of container 12. The outlet 24 is interconnected by apparatus 30 to the core member 14. As can be seen in FIG. 1, the inlet 22 is located at a higher level within container 12 than in the outlet 24. As such, the present invention may operate as a gravity flow apparatus. The buckets 12 may be of any standard design and should be made of a non-reactive, non-corrosive material. Container 12 may have a sealed lid 32 having a suitable opening for pouring off excess liquid while preparing for shipment to a processor. Alternatively, the lid 32 may be sealed to the wall 28 of container 12. It is also possible for the container 12 to incorporate a drainhole for the removal of excess fluid. The container design of the present invention is of a type that is common and known in the art. Specifically, the container design as shown in U.S. Pat. No. 4,441,697, issued on April 10, 1984, to Peterson et al. would be suitable for use in conjunction with the silver recovery system 10 of the present invention.

Core member 14 is positioned within the interior of container 12. Core member 14 includes an aperture 34 so as to allow fluid 36 within container 12 to pass from container 12 through outlet 24. Core member 14 has a flange member 38 extending outwardly therefrom. Flange member 38 is located above the aperture 34 within container 12. The core member 14 is a cylindrical member being made of a non-reactive, non-corrosive material. As can be seen in FIG. 1, the core member 14 is generally in abutment with the base 26 of container 12. Core member 14 also includes a bottom flange 40 that extends outwardly from core member 14. The core member 14 is sealed to both the top flange 38 and the bottom flange 40. The bottom flange 40 will rest in abutment with the base 26 of container 12. The interior of core member 14 will be in fluid communication with the apparatus 30 and outlet 24 of container 12.

It can be seen in FIG. 1 that the core member 14 resembles a standard plastic utility wire spool. It is possible to use a spool as core member 14. When such a standard spool is utilized there will be a hole in the top and the bottom of the core member 14. As shown in FIG. 1, the bottom hole is fitted with plug 42. The top hole 44 is prepared to receive T-fitting 46. Importantly, however, the design of the core member 14 is not intended to be restricted to use of a standard wire spool. It may be possible to incorporate a loose filler material within the interior of core member 14 so as to cause an extra deposit area for the silver salts of the silver-containing solution 34. The core member 14 may also be designed so as to allow the removal and refill of the central area of such loose filler material.

T-fitting 46 engages the opening 44 of core member 14. T-fitting 46 is in fluid communication with the interior of core member 14 so that the solution may pass from core member 14 outwardly through outlet 24. T-fitting 46 is a standard polyvinyl chloride (PVC) fitting that is modified to press or screw on the top of the core member 14. This T-fitting 46 transforms the flow of fluid from its upwardly vertical path in the interior of core member 14 to a substantially horizontal path outward to outlet 24. A coupling member 48 can be used to engage the T-fitting 46 and the outlet 24 so as to allow this flow to occur. The top of T-fitting 46 serves as an antisiphoning device Filler material 16 is arranged adjacent to core member 14 and contained within the area between the top flange 38 and the bottom flange 40 of core member 14. Filler material 16 is a metal above silver in the electromotive force series. Ideally with the preferred embodiment of the present invention, the filler material is wound around core member 14. The filler material shall be of such a size so as to abut the interior wall of the fluid deflector 18. Specifically, the filler material 16 is wound steel wire. The wire may be wound in the fashion of a spool about the core member 14 so as to provide the filler material 16 with the desired capacity. When such a filler is used, the wire should not be wrapped so tightly so as to prevent the filler material 16 from being transversely permeable. The diameter of the filler material 16 may be varied, within limits imposed by the size of the particular container utilized, so as to provide recovery units of varying capacity. Importantly, the present invention should not be limited to just wound wire. It may be possible to utilize substances such as steel shot or other loose material that may be held in place. If a loose metal filler material 16 were utilized, then some apparatus must be utilized so as to maintain the material in position relative to core member 14.

Fluid deflector 18 is in close juxtaposition with filler material 16. The upper end of the fluid deflector 18 is in sealed relationship with the top flange 38. The other end 50 of fluid deflector 18 is separated from the bottom flange 40 of core member 14. This separation is necessary so as to allow fluid to pass between the bottom 50 of fluid deflector 18 and the upper surface of the bottom flange 40. The fluid deflector should be comprised of a non-corrosive, non-reactive material. In addition, the fluid deflector 18 should be non-porous. In FIG. 1, small arrows show the direction of fluid flow relative to the fluid deflector 18. It can be seen that the fluid flow must flow downwardly to avoid the fluid deflector 18 and then upwardly through the thick body of the filler material 16. The length of the fluid deflector 18 can be varied so long as the deflector extends downwardly beyond the aperture 54 of the core member 14.

The fluid deflector 18 is an important aspect of the present invention. Prior art patents, discussed hereinbefore, have all allowed the silver-containing solution to come in contact with the filler material 16 from top to bottom at the same time. This feature is undesirable to the user in that it allows the highly corrosive solution to pass to the nearest exit in the core member 14. In addition, the prior art devices allow the fresh warm solution from the photographic developer to first come in contact with the top portion of the filler material 16. This condition causes an extremely unbalanced concentration of solution in the container. Silver is attracted to the top of the filler and allows the higher corrosive solution to settle to the bottom of the container. This will create two troublesome problems. First, it creates a highly corrosive flow in the bottom of the container directly to the nearest exit. A corrosive path as little as one thirty second (1/32) of an inch will send an unprocessed solution to the exit very quickly. Secondly, the silver salts will tend to plate at the top of the filter in such quantities so as to break off large areas of the filter and allow the solution to reach the core member. As a result, the unprocessed solution will be expelled before the filler is depleted. The present invention, on the other hand, utilize the fluid deflector 18 to force the fresh solution down to the bottom 50 of the deflector 18. This keeps the concentration equal and allows the full filler material 16 to be used in the process. The solution must pass through the entire filler material 16 before exiting through aperture 34. Although this is the preferred embodiment of the present invention, the deflector 18 may be relocated, as required, so long as the deflector will surround the exit hole 34. The exit hole 34 may be a single hole or may be several holes, as required by the particular process. The important aspect of the present invention is that the fluid deflector surrounds the circumferential area about aperture 34.

Figure 4:
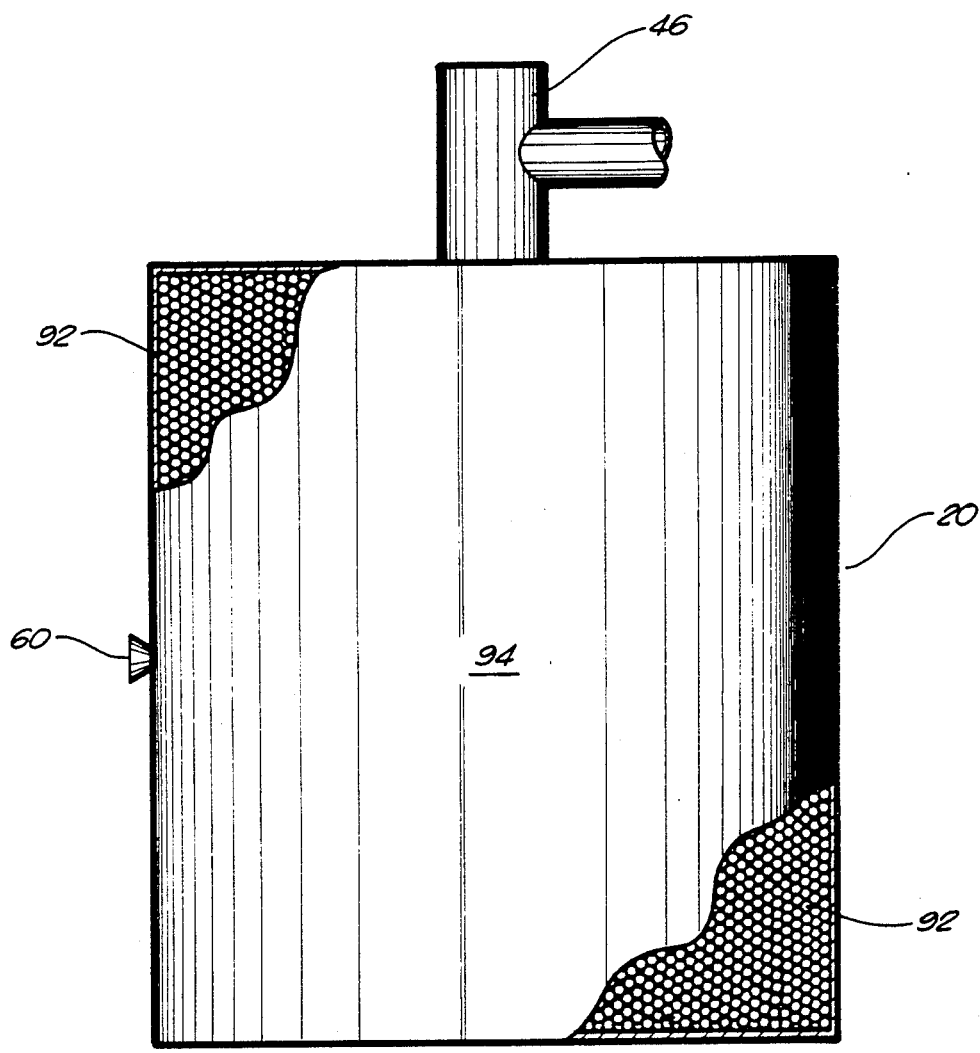
FIG. 4 is a isolated side view taken across lines 4—4 of FIG. 2 shown the plating shield of the silver controller of the present invention.

Plating shield 20 is positioned within container 12 exterior of the fluid deflector 18. Plating shield 20 is designed to allow the silver salts to plate directly on the shield prior to passing to the filler material 16. The plating shield 20 is connected to the top flange 38 and abuts the bottom 26 of container 12 at the other end. The plating shield generally surrounds the fluid deflector within container 12. The plating shield 20 may be porous or perforated, as illustrated in FIG. 4. The porosity of the plating shield 20 allows the silver-containing solution to flow around and through plating shield 20. The plating shield may be supported by the flanges 38 and 40, or it may lay directly over the filler or be located anywhere else in the container 12. The plating shield 20 may be of one piece or several. The shield may be made of steel, or of tightly wound wire. It is important that the shield 20 be separated from the filler material 16. It is believed that the preferred material for the plating shield 20 would be a stainless steel material.

It should be noted, however, that silver will plate to a non-reactive material when electrical changes are created in the silver-containing solution. Thus, it is possible for many different types of material to be used for plating shield 20. Also, the plating shield does not have to be attached to top flange 38. The plating shield will function properly so long as the silver-containing solution will flow through, around, or over plating shield 20.

A conductive member 60 establishes electrical contact between the filler material 16 and the plating shield 20. Specifically, the conductive material 60 is a conductive screw that threadedly engages core member 14, extends through the filler material 16, extends through the fluid deflector 18, and engages the plating shield 20. This conductive member 60 serves two purposes. First, the conductive member 60 can be utilized to hold the configuration of the separate components together. As such, the conductive member 60 can act as a structural member for the silver recovery apparatus 10. Secondly, and more importantly, the conductive member 60 acts to conduct the electrical charge produced from the filler material 16 when two dissimilar metals come in contact in an acid solution.

The plating shield 20 offers important advantages to the present invention. The plating shield 20 is designed to plate the pure silver out of the solution before reaching the filler material 16. If the solution 36 reaches the filler material 16 before plating out, then the silver will plate to the highly corrosive mesh material as the filler material is deleted. The silver and the filler will then fall to the bottom of container 12. When this happens, it is almost impossible for the user to determine the amount of silver that has been recovered. However, by the use of the plating shield 20, the silver-laden plating shield can be removed, silver scraped off, and the user will known within a few ounces the amount of silver that has been recovered. This is an extremely desirable requirement for all users of silver recovery equipment.

Figure 2:
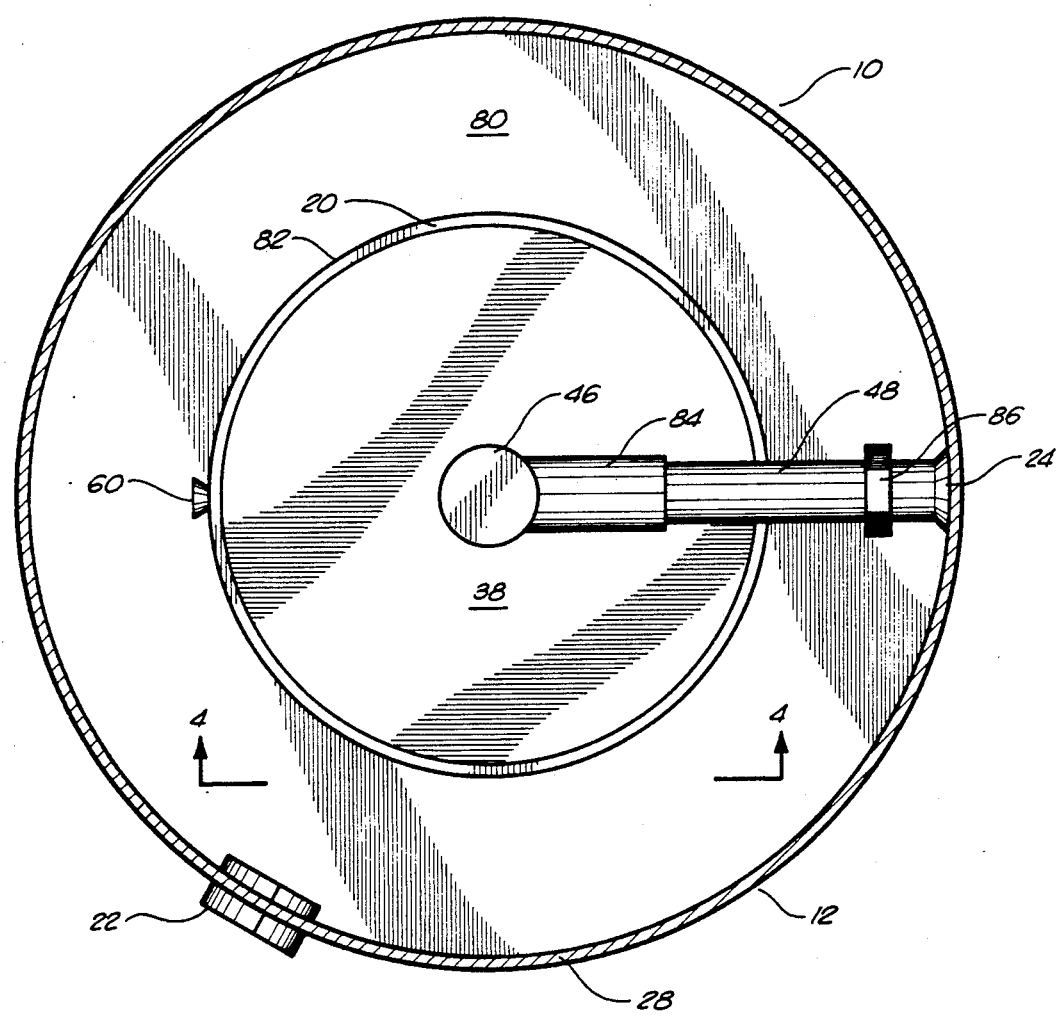
FIG. 2 is a cross-sectional view taken across lines 2—2 of FIG. 1 of the silver controller.

Referring to FIG. 2, the silver controller 10 is illustrated as viewed, in cross-section, below the lid of container 12. Initially, it can be seen that the inlet 22 extends through the wall 28 of the bucket 12. The silver-containing solution will accumulate in the reservoir area 80 prior to passing through and depositing on the plating shield 20. Plating shield 20 is cylindrical in configuration and is generally concentric with the container 12. The conductive screw 60 extends outwardly beyond the wall 82 of plating shield 20. The top flange 38 is illustrated as solid and extending over the filler material 16 and the core member 14. The T-fitting 46 is centrally located within container 12 on flange 38. T-fitting 46 extends into flange 36 so as to communicate with the interior of the core member 14. The connector 48 engages the portion 84 of T-fitting 46. Connector 48 connects to the outlet 24. Outlet 24 opens through wall 28 of container 12. Although FIG. 2 shows the cylindrical and circular nature of the relationships of the items in the silver controller of the present invention, this is not considered an absolute requirement of the present invention. Various configurations, shapes, and arrangements are within the scope of the present invention.

Figure 3:
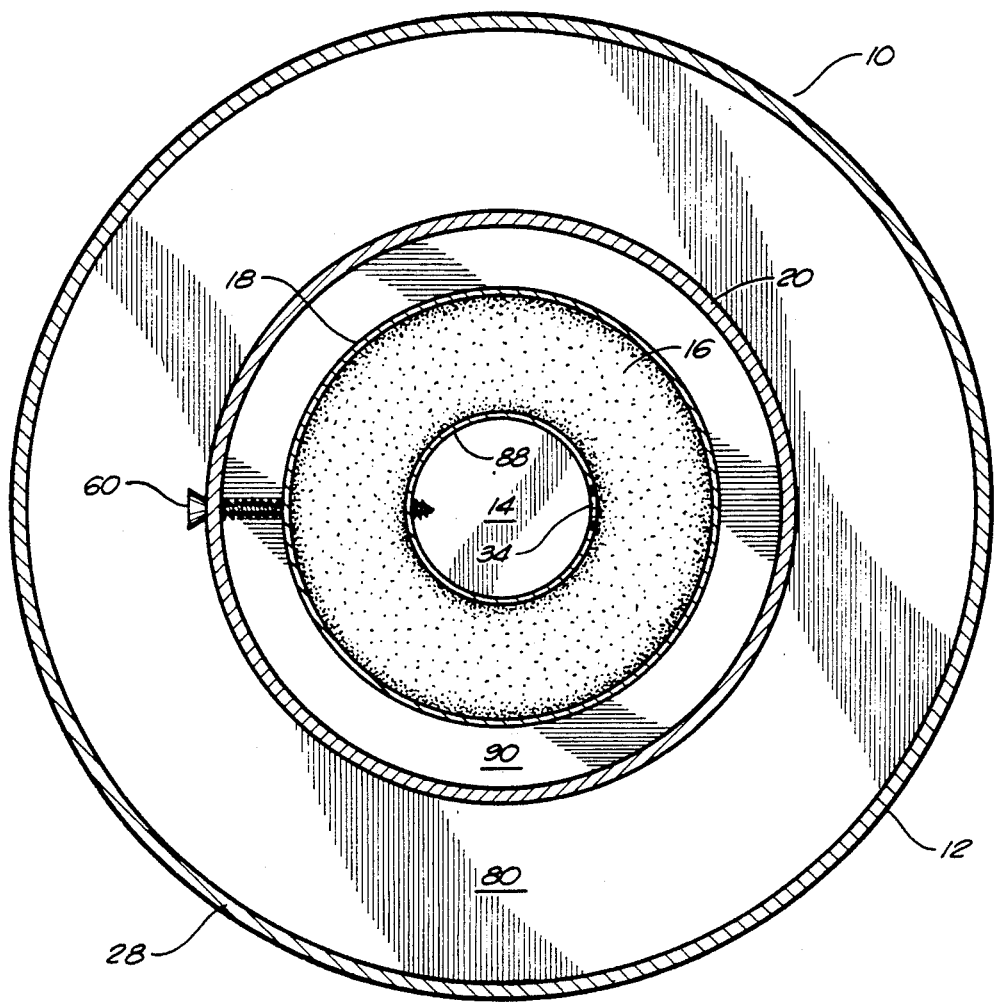
FIG. 3 is a cross-sectional view taken across lines 3—3 of FIG. 1 of the silver controller of the present invention.

Referring to FIG. 3, there is shown the silver controller 10 in cross-section as illustrated below the top flange 38. Specifically, in FIG. 3, it can be seen that the filler material 16 resides fully in the area between the core member 14 and the fluid deflector 18. It is desirable to position the inner wall of fluid deflector 18 as closely as possible to the filler material 16. It can be seen that the core member 14 is a cylindrical member having wall 88. The exterior wall 88 is in close juxtaposition to the filler material 16. The aperture 34 extends through the wall 88 of core member 14 so as to allow the flow of silver-depleted solution to pass into the interior of core member 14. The plating shield 20 is concentric with the fluid deflector 18 and is separated by area 90. Area 90 allows the, flow of fluid to pass from the walls of plating shield 20 into the bottom of the filler material 16. In FIG. 3, it can be seen that the conductive member 60 extends through the plating shield 20, the fluid deflector 18, the filler material 16, and the wall 88 of core member 14.

FIG. 4 is an illustration of the plating shield 20 as used in the silver controller 10 of the present invention. It can be seen that plating shield 20 includes a plurality of apertures 92 extending throughout the entire surface of plating shield 20. These apertures 92 allow the silver-containing solution to pass therethrough such that the silver is deposited on the surface 94 of plating shield 20. Since plated silver is porous, the accumulation of the silver on surface 94 of plating shield 20 will not restrict or impede solution flow. Conductive member 60 extends outwardly beyond the wall of plating shield 20. The T-fitting 46 is shown as extending upwardly from within the area defined by the plating shield 20. Although the preferred embodiment of the present invention shows a perforated metal plating shield, a variety of other configurations could be utilized for the same purposes as the perforated plating shield 20. For example, stainless steel screen could be utilized as the plating shield 20. As used herein, the term "perforated" includes metal plating shields having a porosity suitable for allowing fluid to flow therethrough.

Figure 5:
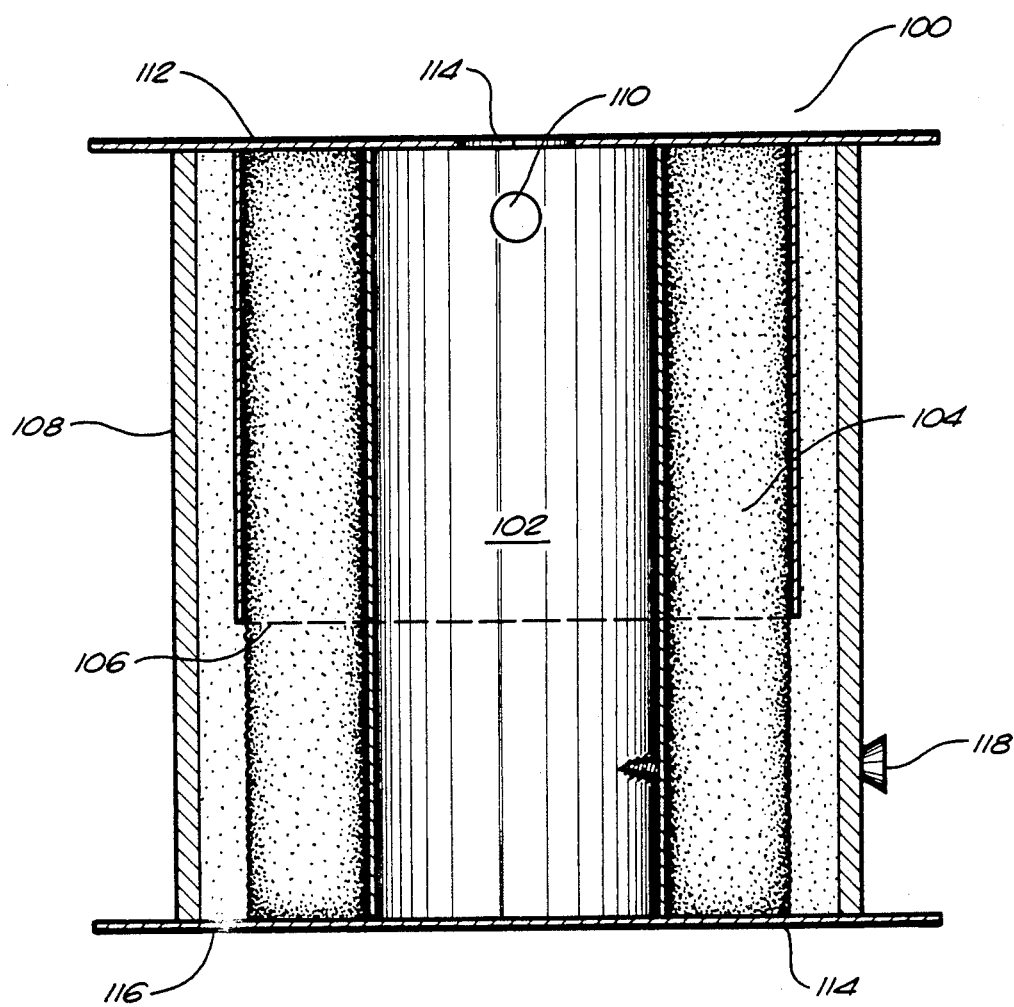
FIG. 5 is a cross-sectional view showing an alternative embodiment of the present invention.

FIG. 5 shows an alternative embodiment 100 of the silver controller of the present invention. Specifically, silver controller 100 includes core member 102, filler material 104, fluid deflector 106, and plating shield 108. As with the previous embodiment, the core member 102 includes an aperture 110 and a top flange 112 and a bottom flange 114. The apparatus 100 illustrated in FIG. 5 will, of course, be inserted into a container of a type illustrated in FIG. 1. Suitable T-fittings or other flow devices are attached to the opening 114 of core member 102 so as to allow fluid to flow from the interior of core member 102 outwardly from the associated container. The plating shield 108 is shown as being wound stainless steel screen wire. A spacer material 116 is placed between the fluid deflector 106 and the plating shield 108. The spacer material 116 can be a material suitable for filtering some components from the silver-containing solution. The spacer material would also act as a secondary filler material for removing silver. Alternatively, the spacer material could be utilized so as to insulate the filler material 104 from the plating shield 108. In this embodiment, it is important to note that a spacer material can be inserted and utilized in the area between the plating shield 108 and the fluid deflector 106. Connector 118 is positioned and engages the core member 102, the filler material 104, the spacer material 116 and the plating shield 108 in a manner described herein previously.

Figure 6:
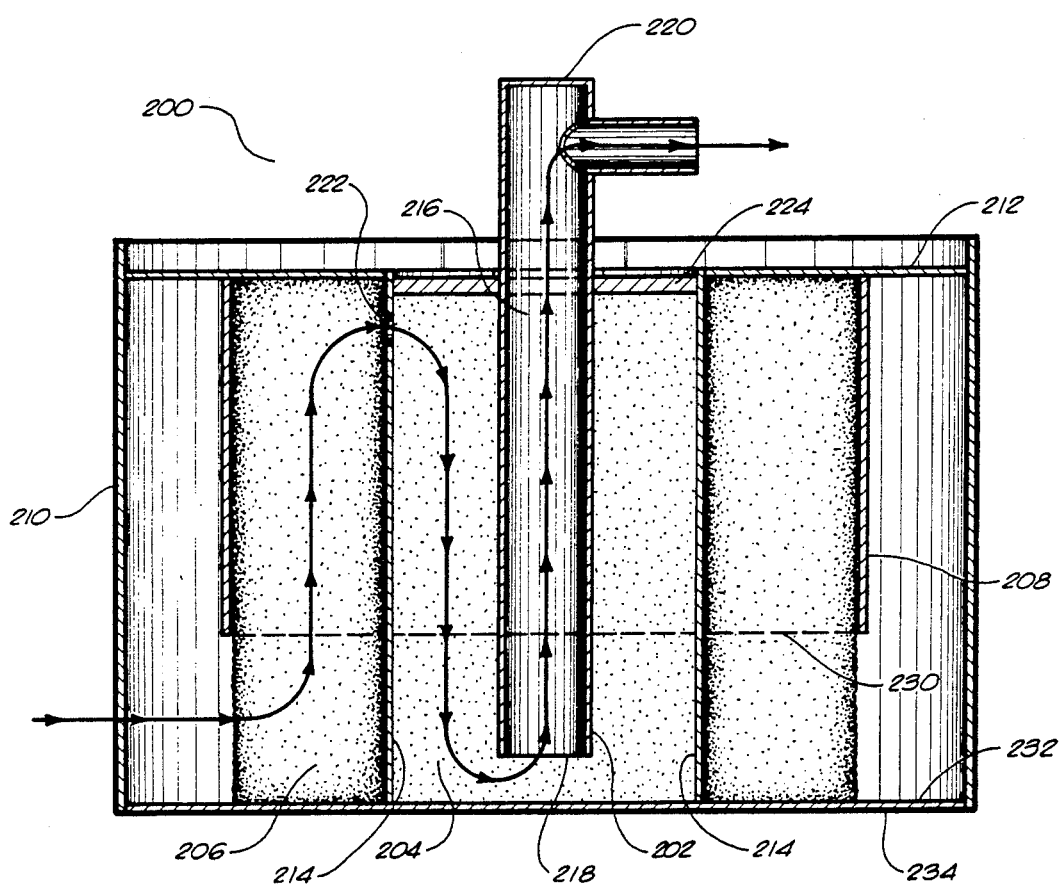
FIG. 6 is a cross-sectional view of another alternative embodiment of the present invention.

FIG. 6 shows still another alternative embodiment 200 of the silver controller of the present invention. Silver controller 200 includes core member 202, secondary filler material 204, primary filler material 206, fluid deflector 208, and plating shield 210. It can be seen that the top flange 212 extends outwardly from the core member 202. Core member 202 has walls 214 and an inner flow receiving tube 216. Inner flow-receiving tube 216 has opening 218 at its bottom so as to allow the passage of solution upwardly through tube 216 and outwardly through T-fitting 220 (as shown by the arrows in FIG. 6). The walls 214 of core member 202 include an opening 222 near the top of the core member 202. Opening 222 allows the flow of solution into the core member 202. A removable cap 224 may be placed onto the top of core member 202 so as to allow access to the secondary filler material 204 within core member 202. The secondary filler material 204 may be a loose, replacable filler material that serves the purpose of secondary removal of silver from the silver-containing solution. Removable cap 224 may be threadedly connected to the core member 202.

The primary filler material 206 may be of a type described herein previously, such as wound steel wire. The fluid deflector 208 causes the fluid flow to enter from the area between the bottom 230 of fluid deflector 208 and the top 232 of bottom flange 234. The plating shield 210 is of a type described herein previously.

This embodiment of the present invention allows for the capture of larger amounts of silver from the silver-containing solution prior to expelling from the silver controller 200. In simple terms, a large amount of the silver is plated onto plating shield 210. The remaining silver of the silver-containing solution is deposited within the filler material 206. Any material remaining will then be deposited on the loose, replacable filler material 204 prior to exit from the system. Since the material 204 is replacable, otherwise suitable material such as steel wool or woven screen wire may be utilized as this secondary filler material. In prior art applications, filler material such as steel wool was unacceptable because it lacked resistance to corrosion caused by fixing solution and was subject to uneven dissolution. As a result, resistance-free openings would be formed through such material. However, steel wool is extremely effective in receiving silver deposits. Fortunately, in the present invention, the secondary filler material 204 is replacable so that the disadvantages of steel wool can be mitigated by its easy replacability within the apparatus of alternative embodiment 200.

Figure 7:
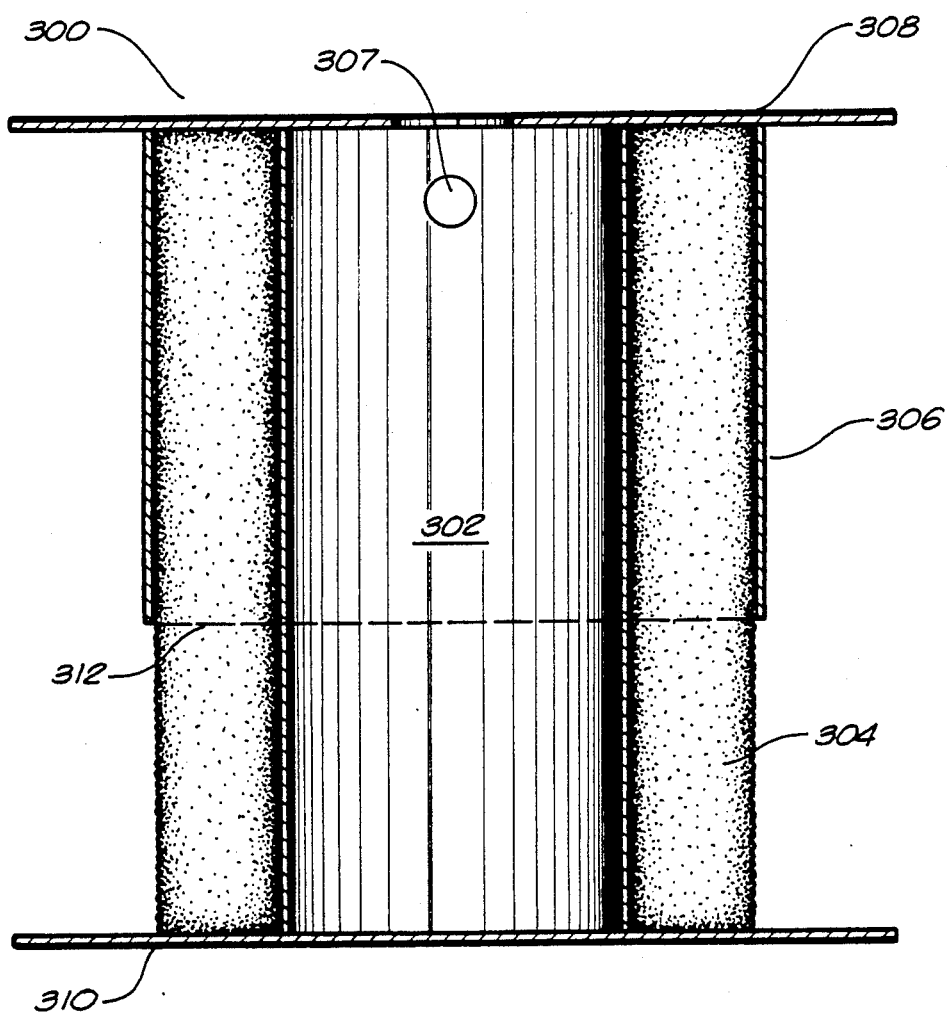
FIG. 7 is a cross-sectional view of the simplest embodiment of the present invention.

Referring to FIG. 7, there is shown at 300 the simplest embodiment of the silver controller of the present invention. This simple embodiment 300 comprises core member 302, filler material 304, and fluid deflector 306. This embodiment of the present invention does not include a plating shield, as do the previous embodiments of the present invention.

Silver controller 300 is interchangeable between various containers. The core member 302 is positioned within the interior of a container. Core member 302 includes an aperture 307 for allowing fluid within the container to pass into this aperture for the purposes of exiting from the container. Core member 302 has a top flange member 308 extending outwardly therefrom. This flange member 308 is located above aperture 307. Core member 302, as with the previous core members, is made of a non-reactive, non-corrosive material. The bottom flange 310 will rest in abutment with the bottom of the container. The filler material 304 is of a type described herein previously.

As can be seen in FIG. 7, the fluid deflector 306 is connected at one end to top flange 308 and extends downwardly therefrom. Although this is the simplest embodiment of the present invention, it should be noted that the fluid deflector 306 can be positioned elsewhere along core member 302. The important aspect of the present invention is that the fluid deflector generally surround the circumferential area adjacent the aperture 307. For example, it may be possible for the fluid deflector 306 to rest on bottom flange 310 if the aperture 307 is also adjacent the bottom flange 310. In this embodiment of the present invention, fluid will enter at the bottom 312 of the fluid deflector 306 and pass through the greatest mass of filler material 304 before entering the aperture 307 for exit.

The present invention offers a number of advantages not offered in the prior art. First, and foremost, the present invention acts, extremely effectively, in the recovery of silver. In contrast with the prior art, the silver is initially plated onto the plating shield of the present invention. Any remaining silver components from the solution are then deposited on the filler material. As a result, very little silver contamination will ever pass from the exit of the container.

The plating shield of the present invention is also effective in the recovery of silver itself. Since the silver will plate onto the plating shield, the vast majority of the silver accumulated can be scraped from the shield, or otherwise removed, and claimed. The life of the filler material will be greatly extended because the silver deposition thereon will be greatly reduced because of the plating shield.

The flow characteristics of the solution passing through the apparatus of the present invention is a great improvement over prior art systems. The present invention forces the flow through the greatest body of the filler material. This allows a greater surface area for silver deposition. Also, the corrosive solution is no longer able to eat passageways through the filler material so as to follow the path of least resistance into the exit. The effectiveness of the present invention and the advantages of the present invention eliminate the more costly and inefficient techniques of the prior art. Stacking of separate recovery units is no longer required. Additional filtration techniques should no longer be necessary.

The foregoing disclosure and description of the invention is illustrative and explanatory thereof, and various changes in the details of the illustrated apparatus, can be made within the scope of the appended claims without departing from the true spirit of the invention. The present invention should only be limited by the following claims and their legal equivalents.

I claim:

1. A silver controller apparatus comprising:
   a container having an inlet and an outlet, said container having a base;
   a core member positioned within said container, said core member having an aperture distal said base, said aperture for passing fluid to said outlet, said core member having a flange member extending outwardly therefrom, said flange member located above said aperture within said container;
   a filler material adjacent said core member, said filler material being a metal above silver in the electromotive force series;
   a fluid deflector extending around said core member and said filler material, said fluid deflector positioned so as to extend below said aperture in said core member, said fluid deflector surrounding said core member and said filler material; and
   a plating shield positioned exterior of said fluid deflector within said container, said plating shield having perforations extending therethrough, said plating shield in sealed engagement with said flange member and said base, said perforations for passing a fluid through said plating shield of a material allowing for the plating of silver thereon, said plating shield encircling said fluid deflector and said filler material.

2. The apparatus of claim 1, said container comprising:
   a non-reactive bucket having an inlet extending through a wall of said bucket, said outlet being interconnected to said core member, said outlet opening through said wall, said inlet being at a higher level than said outlet.

3. The apparatus of claim 1, said core member being a cylindrical member of a non-reactive material, said core member in abutment with the base of said container.

4. The apparatus of claim 1, said core member having a bottom flange extending outwardly therefrom, said core member being sealed to said bottom flange, said bottom flange in abutment with the base of said container, the interior of said core member being in fluid communication with the outlet of said container.

5. The apparatus of claim 3, further comprising:
a T-fitting fitted at one end to said core member so as to be in fluid communication with the interior of said core member, the other end of said T-fitting being in fluid communication with said outlet of said container.

6. The apparatus of claim 1 said filler material being wound around said core member, said filler material abutting the interior of said fluid deflector.

7. The apparatus of claim 4, said fluid deflector in close juxtaposition to said filler material, one end of said fluid deflector being in sealed relation to said flange member, the other end of said fluid deflector being separated from said bottom flange so as to allow fluid to pass between said fluid deflector and said bottom flange, said fluid deflector comprised of a non-reactive material.

8. The apparatus of claim 1, said plating shield being connected to said flange member at one end, the other end of said plating shield abutting the bottom of said container.

9. The apparatus of claim 8, further comprising:
a conductive member in electrical contact between said filler material and said plating shield.

10. The apparatus of claim 9, said conductive member being a conductive screw threadedly engaging said core member, said conductive screw extending through said filler material, said fluid deflector, and said plating shield.

11. The apparatus of claim 1, further comprising:
a secondary filler material contained within the interior of said core member, said secondary filler material being a metal above silver in the electromotive force series.

12. A silver controller apparatus comprising:
a container having an inlet and an outlet, said container having a base;
a core member positioned within said container, said core member having an aperture distal said base, said aperture for passing fluid to said outlet, said core member having a top flange and a bottom flange extending outwardly therefrom;
a filler material adjacent said core member, said filler material being a metal above silver in the electromotive force series;
a plating shield surrounding said filler material and said core member, said plating shield being perforated so as to allow the passage of fluid therethrough, said plating shield in sealed engagement with said top flange and said bottom flange, said plating shield of a material suitable for allowing silver to plate thereon; and
a conductive member affixed to and in electrical contact between said filler material and said plating shield.

13. The apparatus of claim 12, further comprising:
a fluid deflector connected to said top flange and extending downwardly therefrom, said fluid deflector extending below said aperture in said core member, said filler material being in close juxtaposition to the interior of said fluid deflector.

14. The apparatus of claim 13, the other end of said fluid deflector being separated from said bottom flange so as to allow the passage of fluid between said fluid deflector and said bottom flange, said fluid deflector comprised of a non-reactive material.

15. The apparatus of claim 12, said core member being a cylindrical member of non-reactive material, the ends of said core member being sealed to said top and bottom flange, said filler material being wound around said core member, said bottom flange being in abutment with the base of said container.

16. The apparatus of claim 12, further comprising:
a secondary filler material contained within the interior of said core member, said secondary filler material being a metal above silver in the electromotive force series.

* * * * *